United States Patent [19]

Imamura et al.

[11] 4,363,853
[45] Dec. 14, 1982

[54] HOT-MELT POLYESTER

[75] Inventors: Kazuyoshi Imamura; Norio Akimoto; Shozo Awaya, all of Nobeoka, Japan

[73] Assignee: Asahi Kasei Kogyo Kabushiki Kaisha, Osaka, Japan

[21] Appl. No.: 242,226

[22] Filed: Mar. 10, 1981

Related U.S. Application Data

[63] Continuation of Ser. No. 74,479, Sep. 11, 1979, abandoned.

[30] Foreign Application Priority Data

Sep. 20, 1978 [JP] Japan .................................. 53-115391

[51] Int. Cl.$^3$ ...................... B32B 27/36; C08G 63/16
[52] U.S. Cl. .................................... 428/480; 428/349; 428/355; 428/411; 428/430; 428/458; 428/540; 528/302; 528/309
[58] Field of Search ................ 528/302, 309; 428/480, 428/349, 355, 411, 430, 458, 540

[56] References Cited

U.S. PATENT DOCUMENTS

| | | | |
|---|---|---|---|
| T925,005 | 8/1974 | Chen | 528/302 |
| 2,863,854 | 12/1958 | Wilson | 528/302 |
| 2,870,124 | 1/1959 | Ham | 528/302 |
| 2,892,747 | 6/1959 | Dye | 528/302 |
| 3,091,600 | 5/1963 | Caldwell | 528/302 |
| 3,212,920 | 10/1965 | Chapman | 528/302 |
| 3,959,062 | 5/1976 | Hoh | 428/480 |
| 4,059,715 | 11/1977 | Pletcher | 428/349 |
| 4,062,907 | 12/1977 | Sublett | 528/302 |
| 4,124,571 | 11/1978 | Georgoudis | 528/302 |
| 4,166,895 | 9/1979 | Buxbaum | 528/302 |
| 4,201,859 | 5/1980 | Agarwal | 528/302 |
| 4,204,014 | 5/1980 | Dorffel | 528/302 |

FOREIGN PATENT DOCUMENTS 51-125424 11/1976 Japan .
52-127940 10/1977 Japan .

Primary Examiner—Ellis P. Robinson
Attorney, Agent, or Firm—Armstrong, Nikaido, Marmelstein & Kubovcik

[57] ABSTRACT

A polyester comprising acid monomer units of terephthalic acid, succinic acid, glutaric acid and isophthalic acid and/or an aliphatic dicarboxylic acid having 6 to 20 carbon atoms and glycol monomer units of a $C_{2-10}$ alkylene glycol in specific proportions has been found to be extremely useful as hot-melt materials such as a hot-melt adhesive, a hot-melt coating material, a hot-melt sealing material and a hot-melt filling material. The present hot-melt polyester has excellent melting characteristics, that is, it can be rapidly molten from a solid state with a high sensitivity to heating to give a molten polyester having a stably low viscosity that does not almost undergo change according to variation of temperature and having an excellent fluidity. Further, the present hot-melt polyester has a good affinity for objects (e.g. adherend) to which the polyester is applied and exhibits excellent bonding or adhesive performance. Moreover, the present hot-melt polyester has improved suppleness and flexibility. The mechanical strength, stretchability and flexibility of the hot-melt adhesive can be much improved while maintaining the melt viscosity thereof at a low level. Thus, there is provided a hot-melt polyester having a well-balanced combination of physical properties that is very important to hot-melt materials.

14 Claims, 3 Drawing Figures

HOT-MELT POLYESTER

This is a continuation of application Ser. No. 74,479, filed Sept. 11, 1979, now abandoned.

This invention relates to a hot-melt polyester. More particularly, the present invention is concerned with a hot-melt polyester which is excellent in melting characteristics and mechanical properties as well as affinity for objects to which the hot-melt polyester is applied.

The term "hot-melt polyester" used herein is intended to mean a polyester which is used alone or in the form of a composition thereof with other various additives to provide hot-melt materials. Examples of the hot-melt materials include a hot-melt adhesive, a hot-melt coating material, a hot-melt sealing material and a hot-melt filling material. Such hot-melt materials, in actual use, are heated to effect melting and fluidization thereof and then cooled to effect solidification thereof, whereby the respective intended purposes are attained. From a viewpoint of properties essentially required for the hot-melt materials, there is no substantial difference, in required properties of the so-called hot-melt polyester itself to be used, between the hot-melt adhesive, the hot-melt coating material, the hot-melt sealing material and the hot-melt filling material. Accordingly, in the specification, the description of the present invention will be made, often referring to a hot-melt adhesive which is a representative example of the above-mentioned hot-melt materials each comprising a hot-melt polyester of the present invention.

Hot-melt adhesives can be advantageously used without necessity of use of a solvent. Illustratively stated, a hot-melt adhesive, in general, is molten under heating and applied to adherends to be bonded, followed by cooling, whereby bonding of the adherends is rapidly completed. The bonding operation can be simply and rapidly done, and the operation can be automated. Further, because the hot-melt adhesive is free of solvent, it has such advantages that the fear of distortion of the adherends due to the action of a solvent can be obviated and that the fear of catching fire and hazardous influence on the workers can be eliminated. For this reason, the hot-melt adhesives recently tend to be widely used in various fields. Generally, a thermoplastic polymer to be used as the hot-melt adhesive is required to have such properties as follows: (i) the thermoplastic polymer should be rapidly molten with a high sensitivity to heating and excellent in applicability or affinity for an adherend; (ii) the thermoplastic polymer, during the heating for making it in a molten state, should not undergo deterioration due to oxidation, decomposition or other actions; (iii) a change in melt viscosity of the thermoplastic polymer relative to a temperature within working temperatures should be regular; (iv) the thermoplastic polymer should have a good strength, stretchability, elasticity, suppleness and flexibility as well as an excellent adhesive strength; (v) the thermoplastic polymer should be excellent in heat resistance, low-temperature resistance, weatherability, solvent resistance and the like; and (vi) the thermoplastic polymer in a molten state should not produce a bad odor and causing stringing.

In general, a polyester type hot-melt adhesive has a good heat resistance, weatherability, solvent resistance and electrically insulating property, and therefore, a polyester type hot-melt adhesive has been increasingly utilized, with great expectation, in the fields in which these characteristics are usefully demonstrated. However, it is to be noted that although the conventional polyester type hot-melt adhesives have the above-mentioned good properties, they have the following defects. Not only the bonding operation should be done under severe conditions, but also the application characteristics of the hot-melt adhesive to an adherend are poor, because the conventional polyester type hot-melt adhesive is slowly molten with a low sensitivity to heating and the resulting melt has a high and instable melt viscosity. Further, said conventional hot-melt adhesive is not suitable for use by means of commercially available applicators with a standard specification, because the fluidity of the melt under heating is poor. Furthermore, the conventional polyester type hot-melt adhesives are poor in mechanical strength, stretchability, suppleness and flexibility. Especially because of being poor in suppleness and flexibility, the conventional polyester type hot-melt adhesives have a defect that the adhesion surface, after bonding, is rigid and poor in suppleness.

For overcoming the above-mentioned defects of the conventional polyester type adhesives, there have heretofore been proposed such copolyesters as polyesters prepared by copolymerization of various combinations of an acid component selected from terephthalic acid, isophthalic acid, adipic acid, azelaic acid, sebacic acid and mixtures thereof with a glycol component selected from ethylene glycol, 1,4-butanediol, 1,6-hexanediol, neopentyl glycol and mixtures thereof. There have also been proposed such polyester ethers as prepared by copolymerization of a polyester and an alkylene ether. However, the above-mentioned defects have not yet been sufficiently overcome by such conventionally proposed copolyesters.

With a view to developing a hot-melt polyester which overcomes the above-mentioned defects and is useful as hot-melt materials such as a hot-melt adhesive, a hot-melt coating material, a hot-melt sealing material and a hot-melt filling material, the present inventors have made extensive and intensive studies. As a result, it has been found that a copolyester containing, as the acid components, succinic acid and glutaric acid in a specific proportion, in addition to terephthalic acid, is free from the above-mentioned defects and is useful to provide a hot-melt material which is excellent in melting characteristics as well as suppleness and flexibility. It has also been found that the incorporation into said copolyester of a member selected from isophthalic acid, a straight chain aliphatic dicarboxylic acid having 6 to 20 carbon atoms and combinations thereof as a further acid component in a specific proportion is effective for imparting to said copolyester not only a toughness but also an affinity for objects to which the hot-melt polyester or hot-melt material is applied. The present invention has been made based on such novel findings.

Accordingly, it is an object of the present invention to provide a hot-melt polyester which can be used alone or in the form of a composition thereof with other additives to provide hot-melt materials such as a hot-melt adhesive, a hot-melt coating material, a hot-melt sealing material, a hot-melt filling material and the like.

It is another object of the present invention to provide a hot-melt polyester of the kind described, which is excellent in melting characteristics, that is, can be rapidly molten with a high sensitivity to heating to give a molten polyester having a stably low viscosity that does not almost undergo change according to variation of temperature and having an excellent fluidity.

It is a further object of the present invention to provide a hot-melt polyester of the character described above, which is excellent in mechanical strength as well as suppleness and flexibility and has an excellent affinity for objects to which the hot-melt polyester is applied.

The foregoing and other objects, features and advantages of the present invention will be apparent to those skilled in the art from the following detailed description and appended claims taken in connection with the accompanying drawings in which:

Figure 1:
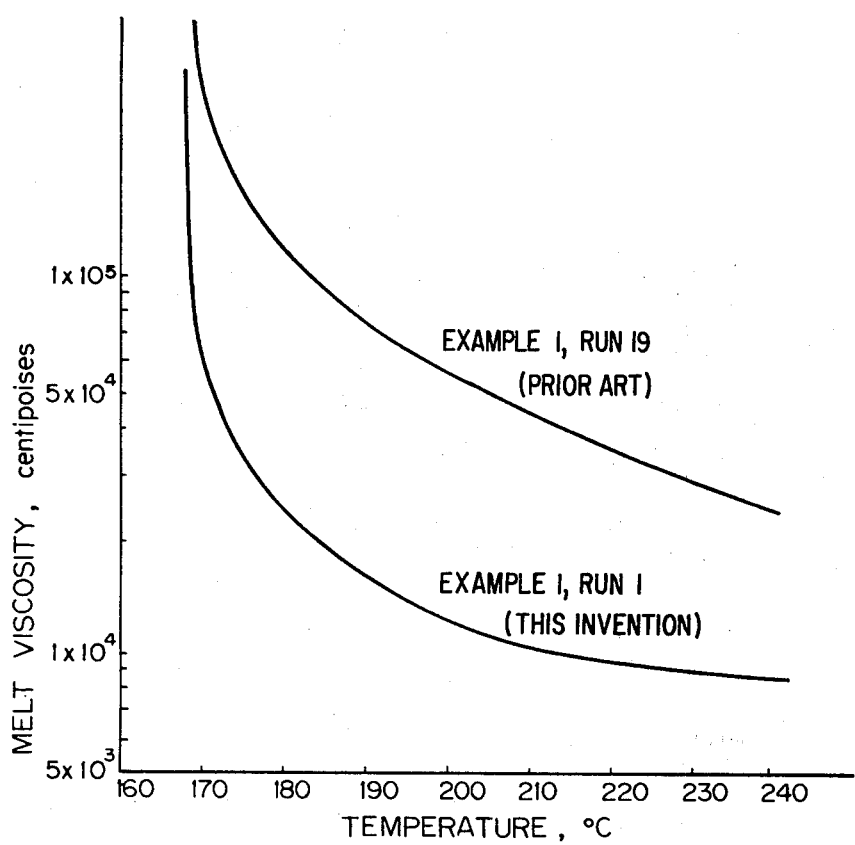
FIG. 1 is a graph showing the relationships between the melt viscosities of the representative example of the present hot-melt polyester and the temperatures, with the graph of the conventional hot-melt polyester shown for the purpose of comparison.

According to the present invention, there is provided a hot-melt polyester which comprises: as the acid components, (I) terephthalic acid monomer units, (II) succinic acid monomer units, (III) glutaric acid monomer units and (IV) a member selected from the group consisting of isophthalic acid monomer units, monomer units of a straight chain aliphatic dicarboxylic acid having 6 to 20 carbon atoms and combination thereof, the proportions of the components (I), (II), (III) and (IV) satisfying the relationships as represented by the following formulae the component (I)=40 to 80 mole % based on the total amount of the components (I), (II), (III) and (IV);

the components (II)+(III)=2 to 50 mole % based on the total amount of the components (I), (II), (III) and (IV);

the components (IV)=5 to 50 mole % based on the total amount of the components (I), (II), (III) and (IV); and the molar ratio of the component (II) to the component (III)=1/9 to 9/1, and as the glycol component, monomer units of at least one of straight chain or branched alkylene glycols having 2 to 10 carbon atoms.

In the hot-melt polyester of the present invention, terephthalic acid monomer units are employed in an amount of 40 to 80 mole %, preferably 40 to 70 mole % based on the total amount of the acid components (I), (II), (III) and (IV). A suitable amount of terephthalic acid monomer units may vary, within said amount range, according to the kinds of the other acid components and the glycol component employed. In this connection, however, it should be noted that the softening point and crystallinity of the hot-melt polyester of the present invention depend on the amount of terephthalic acid monomer units and, therefore, the use of terephthalic acid monomer units in an amount of 40 to 80 mole % based on the total amount of the components (I), (II), (III) and (IV) is very important. When the amount of terephthalic acid monomer units is less than 40 mole %, not only the softening point of the polyester is caused to be extremely low and the crystallinity is lowered but also the initial temperature of the first-order transition of the polyester is lowered, leading to decrease in heat resistance of the hot-melt polyester. On the other hand, where the amount of terephthalic acid monomer units is more than 80 mole %, not only the softening point of the hot-melt polyester becomes too high but also the crystallinity and the rate of crystallization are increased, thereby causing it difficult to practically use the present hot-melt polyester or adhesive by means of a commercially available applicator with a standard specification. This leads to a need of use of a specially designed high-temperature heating type applicator, which is disadvantageous from a viewpoint of energy consumption. Moreover, in the latter case, since the hot-melt polyester has a high crystallinity as mentioned above, when it is used as a hot-melt adhesive, the difference in internal stress is liable to occur between the adherend and the adhesive layer according to the cooling conditions, so that the adhesion to the adherend is instable. This raises a problem of control of the cooling conditions, which control is very difficult to effect.

In the hot-melt polyester of the present invention, the amount of succinic acid monomer units plus glutaric acid monomer units is in the range of 2 to 50 mole %, preferably 5 to 40 mole % based on the total amount of the acid components (I), (II), (III) and (IV). In the hot-melt polyester of the present invention, incorporation of succinic acid monomer units and glutaric acid monomer units serves to improve the suppleness and flexibility of the hot-melt polyester while keeping the softening point of the polyester unchanged. Where the amount of succinic acid monomer units plus glutaric acid monomer units is less than 2 mole %, its effect is not appreciable. Whereas, where the total amount of the monomer units of both acids is more than 50 mole %, though the polyester is flexible, the polyester is liable to be cracked at a bent portion thereof when it is bent. In addition, not only the softening point of the polyester but also the initial temperature of the first-order transition is lowered, leading to decrease in heat resistance of the hot-melt polyesters. In case either succinic acid or glutaric acid is employed alone, the above-mentioned advantageous effects are not manifested, but such effects can be obtained only by the use, in combination, of succinic acid and glutaric acid. The molar ratio of succinic acid monomer units to glutaric acid monomer units is in the range of 1/9 to 9/1, preferably 2/8 to 8/2. In preparing the hot-melt polyester of the present invention, there may be employed commercially available succinic acid and glutaric acid of reagent grade. Alternatively, without any difficulty, there may be employed a mixture of succinic acid, glutaric acid and adipic acid which is obtained as a by-product in the production of adipic acid, for example, by the oxidation of cyclohexanol and/or cyclohexanone. In the production of adipic acid by the oxidation process, there is obtained as the by-product a mixture which comprises 10 to 30 mole % of succinic acid, 40 to 80 mole % of glutaric acid and 10 to 30 mole % of adipic acid, the mole percents being based on the total amount of the acids. In preparing the hot-melt polyester of the present invention, the use of the above-mentioned mixture of acids leads to a great advantage from the viewpoint of the material cost.

In the hot-melt polyester according to the present invention, there is present, as the component (IV) of the acid components, 5 to 50 mole %, preferably 10 to 40 mole %, based on the total amount of the components (I), (II), (III) and (IV), of a member selected from the group consisting of isophthalic acid monomer units, monomer units of a straight chain aliphatic dicarboxylic acid having 6 to 20 carbon atoms and combinations thereof. Of the properties required for the hot-melt polyester to be used as a hot-melt material, especially as a hot-melt adhesive, such properties as toughness and bonding characteristics are improved by the use of the component (IV) of the acid components. The amount of the component (IV), namely, a member selected from the group consisting of isophthalic acid monomer units, monomer units of a straight chain aliphatic dicarboxylic acids having 6 to 20 carbon atoms and combinations thereof is suitably in the range of 5 to 50 mole % based on the total amount of the component (I), (II), (III) and (IV), in order for a hot-melt polyester to have excellent toughness and bonding to adhesive characteristics. Where the amount of the component (IV) is less than 5 mole % based on the total amount of the acid components, not only the polyester is rigid and brittle but also the affinity of the polyester for objects to which the polyester is applied is poor. On the other hand, where the amount of the component (IV) is more than 50 mole %, the polyester is poor in suppleness and, hence, is brittle for bending. More preferred amount of the component (IV) is 10 to 40 mole % based on the total amount of the components (I), (II), (III) and (IV). In the present invention, as the component (IV), the isophthalic acid monomer units may be advantageously employed, and they may be employed alone or in combination with monomer units of at least one of straight chain aliphatic dicarboxylic acids having 6 to 20 carbon atoms. Specific examples of straight chain aliphatic dicarboxylic acids having 6 to 20 carbon atoms to be used in the present invention include adipic acid, pimelic acid, suberic acid, azelaic acid, sebacic acid, 1,9-nonanedicarboxylic acid, 1,10-decanedicarboxylic acid and 1,16-hexadecanedicarboxylic acid. Of the above-mentioned aliphatic dicarboxylic acids, there are preferably employed adipic acid, azelaic acid, sebacic acid and 1,10-decanedicarboxylic acid. Adipic acid is most preferred because, as mentioned before, the introduction of adipic acid monomer units into a hot-melt polyester can be attained simultaneously with the introduction of the components (II) and (III) by the use of a mixture of succinic acid, glutaric acid and adipic acid which mixture is obtained as the by-product in the production of adipic acid by the oxidation of cyclohexanol and/or cyclohexanone and because the presence of adipic acid monomer units in a polyester has an advantageous effect on the hot-melt polyester of the present invention as will be mentioned later. The molar ratio of the isophthalic acid monomer units to the monomer units of the straight chain aliphatic dicarboxylic acids having 6 to 20 carbon atoms may preferably be in the range of from 100/0 to 10/90. Of the straight chain aliphatic dicarboxylic acids having 6 to 20 carbon atoms, as mentioned above, adipic acid is most prefered. The crystallinity of a hot-melt polyester depends primarily on the amount of terephthalic acid monomer units and secondarily on the amount of isophthalic acid monomer units. Illustratively stated, the incorporation of isophthalic acid monomer units into a hot-melt polyester of the present invention serves to decrease the crystallinity of the hot-melt polyester without lowering the softening point thereof, thereby improving the bonding or adhesive performance of the hot-melt polyester. Further, by the incorporation of isophthalic acid monomer units in combination with adipic acid monomer units into a hot-melt polyester of the present invention, there can be obtained a hot-melt polyester having an excellent melt stability, that is, the so obtained hot-melt polyester does not undergo discoloration nor trouble of skinning even in the molten state of the hot melt polyester over a period as long as several hours to ten and several hours. Such a hot-melt polyester can be advantageously used as a hot-melt material, especially as a hot-melt adhesive. The molar ratio of isophthalic acid monomer units to adipic acid monomer units may be in the range of 100/0 to 10/90, preferably in the range of 80/20 to 20/80.

As the glycol component of the hot-melt polyester of the present invention, there are employed monomer units of at least one of straight chain or branched alkylene glycols having 2 to 10 carbon atoms. As the alkylene glycols, there can be mentioned, for example, ethylene glycol, 1,3-propanediol, 1,4-butanediol, 1,6-hexanediol, 1,10-decanediol and neopentyl glycol. They may be used either alone or in combination.

In the hot-melt polyester of the present invention, there may be incorporated other components copolymerizable with said acid components (I), (II), (III) and (IV) and said glycol component. In general, other components may be employed in such an amount as does not spoil the improved properties of the hot-melt polyester of the present invention, that is, preferably in an amount not exceeding 2 mole % based on the total amount of all the monomer units constituting the polyester. As such other components, there can be mentioned, for example, p-hydroxybenzoic acid, bisphenol A, 2,2'-bis[p-(β-hydroxyethoxy)phenyl]propane and 1,2-bis(p-carbomethoxy phenoxy)ethane.

In the hot-melt polyester of the present invention, the kinds and proportions of the acid components (I), (II), (III) and (IV) and the glycol component may be suitably chosen in accordance with the purpose of use of the polyester, but should be within the respective ranges as defined before. Particularly, when the standard specification of an ordinarily used applicator is taken into account, it is practically necessary to employ the defined kinds and proportions so that the hot-melt polyester has a softening point, as measured by a ball and ring test (ASTM E-28-51T), of 80° to 220° C. Further, it is important that the hot-melt polyester of the present invention has a melt viscosity, as measured at a temperature 40° C. higher than the softening point thereof, of 100 to 500,000 centipoises.

Both the softening point and the melt viscosity of the hot-melt polyester can be very easily set up and controlled within the range as mentioned above, and the hot-melt polyester can be advantageously used as a hot-melt material, such as a hot-melt adhesive, a hot-melt coating material, a hot-melt sealing material or a hot-melt filling material, that is easily applicable, with good fluidity, to objects (e.g. adherend) to which the hot-melt material is to be applied. The temperature at which the present hot-melt material is used is not critical, but there may usually be employed a temperature about 40° to about 60° C. higher than the softening point of the hot-melt mateial.

With respect to the hot-melt polyesters of the present invention, it is very difficult to generically define the range of molecular weight or polymerization degree because the different kinds of acid components may be employed in varied proportions. If it is taken into consideration that the present hot-melt polyester is used as the hot-melt material and that the melt viscosity has an indirect relationship with the polymerization degree, the value of melt viscosity as measured at a temperature 40° C. higher than the softening point thereof is sufficient to define the hot-melt polyester of the present invention in this aspect.

The polymerization method for preparing a hot-melt polyester of the present invention is not limited but any ordinarily employed method can be adopted. For example, (I) terephthalic acid, (II) succinic acid, (III) glutaric acid and (IV) isophthalic acid and/or at least one of straight chain aliphatic dicarboxylic acids, or their respective ester-forming derivatives (e.g. dimethyl terephthalate or succinic anhydride) are, in one-stage or stage-wise, subjected to a direct esterification reaction with the glycol or to an ester interchange reaction with the glycol, followed by polycondensation reaction to obtain a hot-melt polyester. In the preparation of the hot-melt polyester of the present invention, there may be optionally employed various kinds of catalysts, oxidation stabilizers or the like as disclosed in, for example, U.S. Pat. No. 4,059,715.

As compared with the conventional hot-melt polyesters, the illustrative advantages of the hot-melt polyester of the present invention will be explained as follows.

In the case of the conventional hot-melt polyester which is prepared by copolymerizing terephthalic acid, isophthalic acid and aliphatic dicarboxylic acids having 6 to 20 carbon atoms with a glycol, even if the softening point of the hot-melt polyester is lowered by regulating the proportions of the components in order that the melt viscosity is reduced, the conventional hot-melt polyester is slowly molten with a low sensitivity of heating, and the resulting melt has a still high and instable melt viscosity and does not exhibit a sufficient fluidity even when it is heated, for example, to a temperature about 40° to about 60° C. higher than the softening point, as shown by Curve 19 in FIG. 1 (the detailed explanation will be given in Example 1). Further, it is noted that even though the softening point is lowered, the melt viscosity is still high, leading to such a disadvantage that when the hot-melt polyester is applied to an object such as adherend, the formed polyester layer often tends to be non-uniform. Furthermore, if the melt viscosity of the polyester is intended to be lowered, the strength, stretchability and flexibility of the polyester are unavoidably decreased and the polyester becomes brittle, thus causing the bonding or adhesive strength of the hot-melt polyester to be extremely poor. As opposed to the above-mentioned conventional hot-melt polyester, the hot-melt polyester of the present invention has excellent melting characteristics. Illustratively stated, the present hot-melt polyester can be rapidly molten from a solid state with a high sensitivity to heating to give a molten polyester having a stably low viscosity that does not almost undergo change according to variation of temperature and having an excellent fluidity, as shown by Curve 1 in FIG. 1 (the detailed explanation will be given in Example 1). As can be understood from Curve 1 in FIG. 1, the hot-melt polyester of Curve 1 exhibits an excellent fluidity at temperatures about 40° to about 60° C. higher than the softening point and, at those temperatures, the melt viscosity-temperature curve is almost linear with a small gradient, thereby making it easy to apply the molten polyester to the objects. Further, the present hot-melt polyester has a good affinity for objects (e.g. adherend) to which the polyester is applied and exhibits excellent bonding or adhesive performance. Moreover, the present hot-melt polyester has improved suppleness and flexibility. Furthermore, it should be noted that, according to the present invention, the mechanical strength, stretchability and flexibility of the hot-melt adhesive can be much improved while maintaining the melt viscosity thereof at a low level. Thus, there can be provided a hot-melt polyester having a well-balanced combination of physical properties that is very important to hot-melt materials.

The hot-melt polyester of the present invention having excellent properties as described above can be advantageously employed as a hot-melt material, for example, a hot-melt adhesive, a hot-melt coating material, a hot-melt sealing material or a hot-melt filling material. Into the hot-melt polyester of the present invention, according to need, there may be incorporated a stabilizer, an inorganic filler, an inorganic pigment, an organic dye, a plasticizer, a flame-proof additive or other thermoplastic resin as disclosed in, for example, Japanese Patent Application Publication No. 25421/1977. The total amounts of these additives to be incorporated may be suitably in the range of 0 to 30 weight % for use as a hot-melt adhesive, in the range of 0 to 50 weight % for use as a hot-melt coating material, in the range of 0 to 30 weight % for use as a hot-melt filling material, and in the range of 0 to 30 weight % for use as a hot-melt sealing material, respectively, the weight percents being based on the respective hot-melt materials.

In case the hot-melt polyester of the present invention is employed as a hot-melt adhesive, it can be provided in the form of, for example, a powder, a pellet, a tape, a string, a film or a cloth so that it can be easily handled. In effecting bonding of adherends, the manner of application of the hot-melt adhesive is not limited. For example, there can be mentioned a manner in which any of various forms of the fabricated pieces of the hot-melt polyester as mentioned above is interposed between the adherends and molten by heating to temperatures above the softening point of the hot-melt polyester, or a manner in which the hot-melt adhesive in a molten state is applied onto the adherends by means of an applicator, followed by cooling for solidification to effect bonding of the adherends. In this connection, the manners suitable for the applications can be adopted according to the demand of application fields, the kind of adherends and the like. Without limitation of materials, forms or the like of the adherends, the hot-melt adhesive of the present invention can be universally employed in various fields for bonding metal, glass, paper, wood, leather, polyvinyl chloride leather, plastics or the like. A more preferred melt viscosity of the present hot-melt polyester to be used as the hot-melt adhesive is in the range of 1,000 to 300,000 centipoises.

As mentioned above, the hot-melt polyester of the present invention can also be employed not only as a coating material to be used for forming a coat film on the surfaces of a metal can, a package for dairy products, a wooden article and the like but also as a sealing material to be used, for example, as a leafproof tape for the side seam of a metal can etc. or for the stitches of a waterproof cloth and the like and as a filling material to be used, for example, as an electrically insulating material for electric parts or the like.

When the hot-melt polyester of the present invention is used as a hot-melt coating material, the polyester is molten at a temperature higher than the softening point thereof and applied onto an object or material to be subjected to coating according to any method known in the art, such as a dip coating, a roll coating, a calender coating, an extrusion coating or a spray coating. Alternatively, the hot-melt polyester in the form of a powder may be applied onto a material to be subjected to coating according to any method known in the art, such as a fluidized bed coating, an electrostatic spray coating or a plasma spray coating. Since the hot-melt polyester of the present invention is low in melt viscosity, it is very easy to control the thickness of the polyester coating layer, which is therefore uniform in thickness and excellent in appearance. A more preferred melt viscosity of the present hot-melt polyester to be employed as the hot-melt coating material is in the range of 500 to 100,000 centipoises.

When the hot-melt polyester of the present invention is used as a hot-melt sealing material, the hot-melt polyester is interposed in the form of a film, a tape, a cloth or the like between the objects or materials to be subjected to sealing and the sealing is effected according to heat sealing using a heater, high-frequency sealing using high-frequency energy or the like. A more preferred melt viscosity of the present hot-melt polyester to be employed as the hot-melt sealing material is in the range of 1,000 to 300,000 centipoises.

When the hot-melt polyester of the present invention is used as a hot-melt filling material, the hot-melt polyester is molten at a temperature higher than the softening point thereof, fed in the molten state through the injection nozzle of a commercially available applicator or a extruder having an injection nozzle attached to the tip end thereof, and poured into a spacing of an object or material to be subjected to filling. A more preferred melt viscosity of the present hot-melt polyester to be employed as the hot-melt filling material is in the range of 500 to 100,000 centipoises.

In the case of use of the hot-melt polyester of the present invention as a filling or sealing material, since the hot-melt polyester of the present invention is low in melt viscosity, the polyester can be easily poured into a spacing of a material or materials to be filled or sealed without failing to fill all the corners of the spacing and, after solidified, the solidified mass of the polyester can exert excellent filling or sealing effect.

The present invention will now be described in more detail with reference to the following Examples that by no means limit the scope of the invention.

In the following Examples and Comparative Examples, the properties of hot-melt polyesters are determined according to the following methods.

1. Softening Point

The softening point of a hot-melt polyester is measured according to ASTM E-28-51T.

2. Initial Temperature of First-Order Transition

The initial temperature of the first-order transition is determined using a differential scanning calorimeter (manufactured and sold by Perkin-Elmer Corp., U.S.A.) in which a 30 mg sample of the hot-melt polyester is heated at a temperature elevation rate of 16° C./min. The initial temperature of the first-order transition is defined to indicate a temperature at which the endothermic peak due to the first-order transition starts to rise.

3. Shore Hardness

The Shore hardness of a hot-melt polyester is measured using a durometer D (ASTM D-2240).

4. Suppleness

Each of the samples of a hot-melt polyester having a thickness of 3 mm and a width of 13 mm is prepared using a hot press machine. The suppleness is defined by a force which is required to bend, by an angle of 90°, the 50 mm-long upper portion of the sample which is fixedly held by a holder, protruding said upper portion thereover. The force is applied to said upper portion at its top end. The measurement is carried out at room temperature.

5. Tensile Shear Bonding Strength

Two aluminum plates having a thickness of 1.6 mm, a length of 150 mm and a width of 25 mm, whose surfaces have been grinded by means of sand paper, and immersed in trichlene for 2 hours and dried at 60° C. for 1 hour. A 25 mm×12.5 mm×0.1 mm film of a hot-melt adhesive is interposed between the two aluminum plates, which have their respective end portions (12.5 mm in length) overlapping each other through the hot-melt adhesive. The resulting assembly is preheated at a temperature 50° C. higher the softening point of the polyester for 3 minutes and subjected to a cold press at a pressure of 30 Kg/cm² for 5 minutes to effect bonding of the aluminum plates with the adhesive. These specimens are allowed to stand in a thermostat chamber at 20° C. for 24 hours. With respect to each specimen, using an Autograph DSS-500 (trade name of a tensile strength tester manufactured and sold by Shimadzu Seisakusho Ltd., Japan), the tensile shear bonding strength is measured by applying a strength at which each of the specimens is stretched at a rate of 10 mm/min under room temperature.

Figure 2:
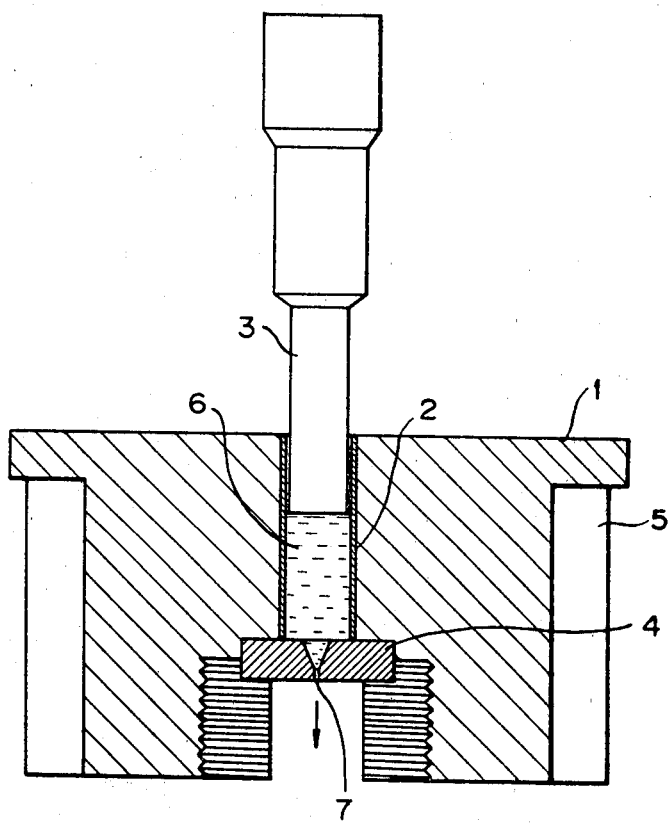
FIG. 2 is a diagrammatic cross-sectional view of an instrument employed for measuring a melt viscosity of hot-melt polyester, partly shown by hatching for making it easy to understand the construction.
Figure 3:
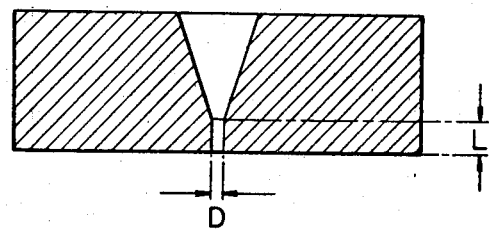
FIG. 3 is an enlarged cross-sectional view of a nozzle disposed in the equipment of FIG. 2.

6. Melt Viscosity (Reference should be made FIGS. 2 and 3)

1. Definition

A predetermined load is loaded upon a sample of a molten polymer through the plunger of a flow tester thereby to extrude the molten polymer through the orifice of a nozzle at the bottom of a cylinder. The distance and time of descent of the plunger are measured. The melt viscosity of the sample polymer is calculated according to the following equation (1):

$$\text{Melt Viscosity (centipoises)} = (T/H) \times P \times K \quad (1)$$

wherein
T is a time (sec) of descent of the plunger;
H is a distance (cm) of descent of the plunger;
P is a load (g); and
K is a constant determined according to the following equation (2):

$$K = \frac{9.8}{2} \times 10^4 \times \frac{(D/2)}{L} \times \frac{(D/2)^3}{4} \pi \quad (2)$$

wherein
L is a length (cm) of the orifice; and
D is a diameter (cm) of the orifice.

2. Measurement

A Koka Type Flow Tester Model 301 (trade name of a product manufactured and sold by Shimadzu Seisakusho Ltd., Japan) is used for the measurement of melt viscosity. A sample polyester 6 is charged into a cylinder 2 (made of stainless steel) located in the center of a heating medium 1 (made of stainless steel) heated at a predetermined temperature by means of a band heater 5. 3 Minutes after charging of the sample polyester, a predetermined load is loaded upon the sample polyester though a plunger 3 to extrude the sample polyester in the direction indicated by an arrow through an orifice 7 of a nozzle 4 (made of stainless steel) at the bottom of the cylinder. The distance of descent of the plunger and the time required for descent of the plunger are measured. The melt viscosity of the sample polyester is calculated according to the equations as described in Definition above.

The cross-section area of the cylinder is 1 cm² and the internal volume of the cylinder is 1 cm³. The length (L) of the orifice is 2.25 mm and the diameter (D) of the orifice is 0.45 mm.

In the following Examples, the names of raw materials are abbreviated as follows.
DMT: dimethyl terephthalate
TPA: terephthalic acid
SUA: succinic acid
GA: glutaric acid
IPA: isophthalic acid
ADA: adipic acid
AZA: azelaic acid
SAB: sebacic acid
DDA: 1,10-decanedicarboxylic acid
HDA: 1,14-tetradecanedicarboxylic acid
1,4BD: 1,4-butanediol
EG: ethylene glycol
1,3PD: 1,3-propanediol
1,5PED: 1.5-pentanediol
1.6HD: 1,6-hexanediol
1.10DD: 1,10-dodecanediol
TIPT: tetraisopropyl titanate

EXAMPLE 1 AND COMPARATIVE EXAMPLE 1

To 97 parts by weight (0.5 mole) of dimethyl terephthalate were added 153 parts by weight (1.7 moles) of 1,4-butanediol and 0.05 parts by weight (0.00016 mole) of tetraisopropyl titanate as a catalyst. The resulting mixture was heated with stirring at 180° to 220° C. for 3 hours under nitrogen stream in a reactor. Under reflux of the 1,4-butanediol the formed methanol was completely removed to effect the intended ester intercharge reaction. To the reaction mixture were added 2 parts by weight (0.02 mole) of succinic acid, 4 parts by weight (0.03 mole) of glutaric acid, 22 parts by weight (0.15 mole) of adipic acid and 13 parts by weight (0.08 mole) of isophthalic acid. The resulting mixture was heated with stirring at 220° C. under reflux of the 1,4-butanediol while removing the formed water out of the reaction system, thereby to effect the esterification reaction. To the esterification reaction mixture thus obtained was added 0.07 parts by weight (0.00023 mole) of tetraisopropyl titanate, and the temperature was elevated from 220° C. to 240° C. over 1 hour, while the pressure of the reaction system was gradually reduced until 0.1 mmHg. The polycondensation reaction was carried out with stirring at a temperature of 240° C. under a pressure of 0.1 mmHg to obtain a hot-melt polyester No. 1 as indicated in Table 2. The softening point of the polyester was 172° C. The relationship between the temperature and the melt viscosity of the polyester No. 1 was as shown by Curve 1 in FIG. 1 (in which the ordinate has a logarithmic scale). As is clearly seen from Curve 1, the polyester No. 1 was rapidly molten by heating to give the molten polyester having a stably low viscosity that does hardly undergo change according to variation of temperature. Such a molten polyester according to the present invention was excellent in fluidity.

Substantially the same procedures as described above were repeated except that the kinds and amounts of acid components, the amount of the catalyst, and the reaction conditions were varied as indicated in Table 1 at Runs Nos. 2 to 19, to obtain hot-melt polyesters respectively having the acid components and the glycol components as indicated in Table 2 at Nos. 2 to 19. The properties of the polyesters are also shown in Table 2.

As compared with the conventional hot-melt polyesters, the hot-melt polyesters of the present invention have a well-balanced combination of properties such as hardness, suppleness, flexibility, softening point, initial temperature of the first-order transition and tensile shear bonding strength (see Table 2).

For the purpose of comparison with the hot-melt polyester No. 1 of the present invention, the temperature-melt viscosity curve 19 of the conventional hot-melt polyester No. 19 is shown in FIG. 1. In spite of the fact that the softening points of the polyesters No. 1 and No. 19 are substantially identical to each other, the hot-melt polyester No. 1 of the present invention has such excellent characteristics as compared with the conventional hot-melt polyester No. 19, that is, melting of the polyester by heating is rapid, the initial dropping of viscosity is extremely sharp to give the molten polyester having a stably low viscosity that does hardly undergo change according to variation of temperature, and the molten polyester is excellent in fluidity.

The polyester Nos. 4 and 6 to 14 as indicated in Table 2 were prepared using, as the raw materials of acid components, the aliphatic dicarboxylic acid mixture (comprising 20 mole % of succinic acid, 60 mole % of glutaric acid and 20 mole % of adipic acid) which was obtained as the by-product in the production of adipic acid, thus leading to a great advantage from a viewpoint of production cost and the like.

TABLE 1

| Run No. | Ester interchange reaction | | | | | Esterification reaction | | | | | | | | | | | Polycondensation reaction | | | | | Remarks |
|---|---|---|---|---|---|---|---|---|---|---|---|---|---|---|---|---|---|---|---|---|---|---|
| | Raw materials, parts by weight | | Catalyst, parts by weight | Reaction conditions | | Other acids added, parts by weight | | | | | | | | Reaction conditions | | Catalyst, parts by weight | Conditions for reduction of pressure | | Reaction conditions | | | |
| | DMT | 1,4BD | TIPT | Temperature, °C | Time, hr | SUA | GA | IPA | ADA | AZA | SBA | DDA | HDA | Temperature, °C | Time, hr | TIPT | Temperature, °C | Time, hr | Temperature, °C | Time, hr | Pressure, mmHg | |
| 1 | 97 | 153 | 0.05 | 180–220 | 3 | 2 | 4 | 13 | 22 | | | | | 220 | 2 | 0.07 | 220–240 | 1 | 240 | 2 | 0.1 | Comparative |
| 2 | 136 | 153 | 0.07 | " | " | 2 | 4 | 4 | | | | | | " | " | 0.07 | " | " | 260 | 2 | " | |
| 3 | 121 | 153 | 0.06 | " | " | 2 | 9 | | 10 | | | | | " | " | 0.07 | " | " | " | 1 | " | Comparative |
| 4 | 106 | 153 | 0.05 | " | " | 4 | 18 | | 7 | | | | | " | " | 0.07 | " | " | 240 | 2 | " | |
| 5 | 106 | 153 | 0.05 | " | " | | | 26 | 12 | | | | | " | " | 0.07 | " | " | " | 3 | " | |
| 6 | 76 | 153 | 0.04 | " | " | 4 | 18 | 26 | 7 | | | | | " | " | 0.07 | " | " | " | 4 | " | |
| 7 | 68 | 153 | 0.03 | " | " | 7 | 30 | | 12 | | | | | " | " | 0.06 | " | " | " | 4 | " | |
| 8 | 68 | 153 | 0.03 | " | " | 5 | 24 | 7 | 9 | | | | | " | " | 0.06 | " | " | " | 1 | " | |
| 9 | 68 | 153 | 0.03 | " | " | 4 | 18 | 20 | 7 | | | | | " | " | 0.07 | " | " | " | 3 | " | |
| 10 | 68 | 153 | 0.03 | " | " | 3 | 15 | 33 | 6 | | | | | " | " | 0.07 | " | " | " | 1 | " | |
| 11 | 68 | 153 | 0.03 | " | " | 3 | 12 | 39 | 5 | | | | | " | " | 0.06 | " | " | " | 2 | " | |
| 12 | 61 | 153 | 0.03 | " | " | 4 | 18 | 46 | 7 | | | | | " | " | 0.07 | " | " | " | " | " | |
| 13 | 61 | 153 | 0.03 | " | " | 1 | 6 | 39 | 2 | | | | | " | " | 0.06 | " | " | " | 1 | " | Comparative |
| 14 | 45 | 153 | 0.02 | " | " | 9 | 42 | 65 | 16 | | | | | " | " | 0.07 | " | " | " | 3 | " | Comparative |
| 15 | 97 | 153 | 0.05 | " | " | 2 | 4 | 13 | | 28 | | | | " | " | 0.08 | " | " | " | 1 | " | |
| 16 | 97 | 153 | 0.05 | " | " | 2 | 4 | 13 | | | 30 | | | " | " | 0.07 | " | " | " | 2 | " | |
| 17 | 97 | 153 | 0.05 | " | " | 2 | 4 | 13 | | | | 35 | | " | " | 0.08 | " | " | " | " | " | |
| 18 | 97 | 153 | 0.05 | " | " | 2 | 4 | 13 | | | | | 47 | " | " | 0.08 | " | " | " | 1 | " | |
| 19 | 97 | 153 | 0.05 | " | " | 2 | 4 | 13 | 30 | | | | | " | " | 0.07 | " | " | " | 3 | " | Comparative |

TABLE 2

| | Polyester | | | | | | | | | |
|---|---|---|---|---|---|---|---|---|---|---|
| | Acid components, mole % | | | | | | | | | Glycol, mole % |
| No. | TPA | SUA | GA | IPA | ADA | AZA | SBA | DDA | HDA | 1,4BD |
| 1 | 64 | 3 | 4 | 10 | 19 | | | | | |
| 2 | 90 | 3 | 4 | 3 | | | | | | |
| 3 | 80 | 3 | 9 | | 8 | | | | | |
| 4 | 70 | 6 | 18 | | 6 | | | | | |
| 5 | 70 | | | 20 | 10 | | | | | |
| 6 | 50 | 6 | 18 | 20 | 6 | | | | | |
| 7 | 45 | 10 | 30 | 5 | 10 | | | | | |
| 8 | 45 | 8 | 25 | 15 | 8 | | | | | |
| 9 | 45 | 6 | 18 | 25 | 6 | | | | | |
| 10 | 45 | 5 | 15 | 30 | 5 | | | | | |
| 11 | 45 | 4 | 12 | 35 | 4 | | | | | |
| 12 | 40 | 2 | 6 | 50 | 2 | | | | | |
| 13 | 40 | 2 | 6 | 50 | 2 | | | | | |
| 14 | 30 | 14 | 42 | | 14 | | | | | |
| 15 | 65 | 3 | 4 | 10 | | 19 | | | | |
| 16 | 64 | 3 | 4 | 10 | | | 19 | | | |
| 17 | 64 | 3 | 4 | 10 | | | | 19 | | |
| 18 | 64 | 3 | 4 | 10 | | | | | 19 | |
| 19 | 64 | | | 10 | 25 | | | | | |

| | | | Properties | | | | |
|---|---|---|---|---|---|---|---|
| No. | softening point, °C. | Initial temperature of first-order transition, °C. | Melt viscosity centipoises | Hardness (Shore-D) | Suppleness, g | Tensile shear bonding strength kg/cm² | Remarks |
| 1 | 100 | 172 | 137 | 10,200 | 45 | 750 | 109 |
| 2 | 212 | 175 | 22,000 | 90 | broken | 26 | Comparative |
| 3 | 193 | 156 | 15,000 | 76 | 900 | 55 | |
| 4 | 181 | 137 | 4,000 | 51 | 700 | 76 | |
| 5 | 177 | 128 | 3,000 | 62 | broken | 38 | Comparative |
| 6 | 142 | 88 | 12,000 | 42 | 250 | 77 | |
| 7 | 128 | 76 | 21,300 | 32 | 150 | 74 | |
| 8 | 128 | 75 | 42,700 | 34 | 200 | 64 | |
| 9 | 129 | 74 | 40,500 | 37 | 205 | 87 | |
| 10 | 130 | 74 | 95,000 | 39 | 220 | 95 | |
| 11 | 127 | 73 | 83,000 | 41 | 190 | 98 | |
| 12 | 112 | 68 | 3,500 | 27 | 110 | 60 | |
| 13 | 98 | 54 | 45,000 | 43 | broken | 34 | Comparative |
| 14 | 92 | 45 | 6,000 | 11 | broken | 5 | Comparative |
| 15 | 168 | 135 | 22,000 | 44 | 860 | 120 | |
| 16 | 167 | 135 | 20,000 | 44 | 840 | 116 | |
| 17 | 166 | 126 | 19,000 | 43 | 780 | 115 | |
| 18 | 165 | 117 | 7,100 | 46 | 850 | 96 | |
| 19 | 175 | 138 | 39,000 | 63 | 2,500 | 102 | Comparative |

Note
"Melt viscosity": measured at a temperature of 40° C. higher than the melting point.
"Broken": used for showing the samples broken during the bending till 90°.

EXAMPLE 2 AND COMPARATIVE EXAMPLE 2

Substantially the same procedures as described in Example 1 were repeated except that the molar ratio of succinic acid to glutaric acid and the amount of the catalyst, and the reaction conditions were varied as indicated in Table 3 at Runs Nos. 20 to 28, to obtain hot-melt polyesters each having acid components and a glycol component as indicated in Table 4 at Runs Nos. 20 to 28. The properties of the polyesters obtained are also shown in Table 4.

As is apparent from Table 4, the hot-melt polyesters of the present invention having molar ratios of succinic acid to glutaric acid 1/9 to 9/1 were remarkably improved especially with respect to suppleness without substantial change in softening point is compared with those comparative polyesters falling outside the scope of the present invention.

TABLE 3

| | Ester interchange reaction | | | | | Esterification reaction | | | | | |
|---|---|---|---|---|---|---|---|---|---|---|---|
| | Raw materials, parts by weight | | Catalyst, parts by weight | Reaction conditions | | Other acids added | | | | Reaction action | |
| Run No. | DMT | 1,4BD | TIPT | Temperature, °C. | Time, hr | SUA | GA | IPA | ADA | Temperature, °C. | Time, hr |
| 20 | 76 | 153 | 0.04 | 180–220 | 3 | 20 | | 26 | | 220 | 2 |
| 21 | 76 | 153 | 0.04 | " | " | 19 | 1.5 | 26 | | " | " |
| 22 | 76 | 153 | 0.04 | " | " | 18 | 3 | 26 | | " | " |
| 23 | 76 | 153 | 0.04 | " | " | 14 | 9 | 26 | | " | " |
| 24 | 76 | 153 | 0.04 | " | " | 10 | 15 | 26 | | " | " |
| 25 | 76 | 153 | 0.04 | " | " | 6 | 21 | 26 | | " | " |
| 26 | 76 | 153 | 0.04 | " | " | 2 | 27 | 26 | | " | " |
| 27 | 76 | 153 | 0.04 | " | " | 1 | 28.5 | 26 | | " | " |

TABLE 3-continued

| Run No. | | | | | | | | | | Remarks |
|---|---|---|---|---|---|---|---|---|---|---|
| 28 | 76 | 153 | 0.04 | " | " | | 30 | 26 | " | " |
| 6 | 76 | 153 | 0.04 | " | " | 4 | 18 | 26 | 7 | " | " |

| | Polycondensation reaaction | | | | | | |
|---|---|---|---|---|---|---|---|
| | Catalyst, parts by weight | Conditions for reduction of pressure | | Reaction conditions | | | |
| Run No. | TIPT | Temperature, °C. | Time, hr | Temperature, °C. | Time, hr | Pressure, mmHg | Remarks |
| 20 | 0.06 | 220–240 | 1 | 240 | 2 | 0.1 | Comparative |
| 21 | 0.06 | " | " | " | " | " | Comparative |
| 22 | 0.06 | " | " | " | 3 | " | |
| 23 | 0.06 | " | " | " | " | " | |
| 24 | 0.06 | " | " | " | " | " | |
| 25 | 0.06 | " | " | " | " | " | |
| 26 | 0.07 | " | " | " | " | " | |
| 27 | 0.07 | " | " | " | 2 | " | Comparative |
| 28 | 0.07 | " | " | " | " | " | Comparative |
| 6 | 0.07 | " | " | " | " | " | |

TABLE 4

| | Polyester | | | | | | | Properties | | | | | |
|---|---|---|---|---|---|---|---|---|---|---|---|---|---|
| | Acid components, mole % | | | | | Glycol, mole % | Softening point, °C. | Initial temperature of first-order transition, °C. | Melt viscosity, centipoises | Hardness (Shore-D) | Suppleness, g | Tensile shear bonding strength, Kg/cm² | Remarks |
| No. | TPA | SUA | GA | IPA | ADA | 1,4 BD | | | | | | | |
| 20 | 50 | 30 | | 20 | | 100 | 144 | 80 | 11,000 | 52 | broken | 35 | Comparative |
| 21 | 50 | 28.5 | 1.5 | 20 | | 100 | 144 | 73 | 16,000 | 50 | 450 | 40 | Comparative |
| 22 | 50 | 27 | 3 | 20 | | 100 | 145 | 75 | 21,200 | 47 | 370 | 68 | |
| 23 | 50 | 21 | 9 | 20 | | 100 | 143 | 78 | 20,600 | 43 | 300 | 75 | |
| 24 | 50 | 15 | 15 | 20 | | 100 | 143 | 75 | 20,200 | 42 | 330 | 81 | |
| 25 | 50 | 9 | 21 | 20 | | 100 | 141 | 68 | 22,000 | 42 | 310 | 76 | |
| 26 | 50 | 3 | 27 | 20 | | 100 | 144 | 78 | 15,300 | 43 | 430 | 74 | |
| 27 | 50 | 1.5 | 28.5 | 20 | | 100 | 142 | 76 | 17,200 | 44 | 520 | 43 | Comparative |
| 28 | 50 | | 30 | 20 | | 100 | 140 | 82 | 8,300 | 49 | broken | 42 | Comparative |
| 6 | 50 | 6 | 18 | 20 | 6 | 100 | 142 | 88 | 12,000 | 42 | 250 | 77 | |

EXAMPLE 3

Substantially the same procedures as described in Example 1 were repeated except that the kinds of glycol components and catalyst, the amount of the polycondensation catalyst and the reaction conditions were varied as indicated in Table 5 at Runs Nos. 29 to 34, to obtain hot-melt polyesters each having the acid components and the glycol component as indicated in Table 6 at Runs Nos. 29 to 34. The properties of the polyesters obtained are also shown in Table 6.

TABLE 5

| | Ester interchange reaction | | | | | | | | Esterification reaction | | | | | | |
|---|---|---|---|---|---|---|---|---|---|---|---|---|---|---|---|
| | Raw materials, parts by weight | | | | | | Catalyst, parts by weight | Reaction conditions | | Other acids added, parts by weight | | | | Reaction conditions | |
| Run No. | DMT | EG | 1.3PD | 1.5PED | 1.6HD | 1.10DD | TIPT | Temperature, °C. | Time, hr | SUS | GA | IPA | ADA | Temperature, °C. | Time, hr |
| 29 | 97 | 105 | | | | | 0.05 | 180–220 | 3 | 3 | 7 | 13 | | 220 | 2 |
| 30 | 80 | 105 | | | | | 0.04 | " | " | 11 | 22 | | 12 | " | " |
| 31 | 80 | | 129 | | | | 0.04 | 180–240 | " | 3 | 12 | 35 | 5 | 240 | " |
| 32 | 106 | | | 177 | | | 0.05 | 180–230 | " | 3 | 12 | 13 | 5 | " | " |
| 33 | 106 | | | | 201 | | 0.05 | 180–220 | " | 3 | 12 | 13 | 5 | 220 | " |
| 34 | 106 | | | | | 296 | 0.05 | 180–240 | " | 3 | 12 | 13 | 5 | 240 | " |

| | Polycondensation reaction | | | | | | |
|---|---|---|---|---|---|---|---|
| | Catalyst, parts by weight | Conditions for reduction of pressure | | Reaction conditions | | | |
| Run No. | Sb₂O₃ | Temperature, °C. | Time, hr | Temperature, °C. | Time, hr | Pressure, mmHg | Remarks |
| 29 | 0.06 | 220–240 | 1 | 240 | 3 | 0.1 | |
| 30 | 0.06 | " | " | " | " | " | |
| 31 | 0.07 | 240 | " | " | " | " | |
| 32 | 0.07 | " | " | " | 2 | " | |
| 33 | 0.07 | " | " | " | " | " | |
| 34 | 0.07 | " | " | " | 1 | " | |

TABLE 6

| No. Run | Acid components, mole % | | | | | Glycol | | Softening point, °C. | Melt viscosity, centipoises | Tensile shear bonding strength Kg/cm² | Remarks |
|---|---|---|---|---|---|---|---|---|---|---|---|
| | TPA | SUA | GA | IPA | ADA | Kind | content, mole % | | | | |
| 29 | 64 | 4 | 7 | 10 | 15 | EG | 100 | 178 | 43,000 | 85 | |
| 30 | 53 | 15 | 22 | | 10 | EG | 100 | 120 | 48,000 | 108 | |
| 31 | 53 | 4 | 12 | 27 | 4 | 1.3PD | 100 | 136 | 36,000 | 76 | |
| 32 | 70 | 4 | 12 | 10 | 4 | 1.5PED | 100 | 86 | 18,000 | 93 | |
| 33 | 70 | 4 | 12 | 10 | 4 | 1.6HD | 100 | 133 | 15,000 | 82 | |
| 34 | 70 | 4 | 12 | 10 | 4 | 1.10DD | 100 | 101 | 8,900 | 62 | |

EXAMPLE 4

With respect to the hot-melt polyesters Nos. 6, 7, 11, 12 and 30 obtained in Examples 1 and 3, suitability as a coating material was examined as follows. A pellet of each of the hot-melt polyesters was put on a mild steel plate having a thickness of 2 mm and allowed to stand in a dryer thermostatically controlled at 180° C. for 15 minutes, thereby to effect complete melting of the pellet. The mild steel plate was taken out of the dryer and the molten polyester was instantly extended all over the mild steel plate by using a commercially available bar coater for thin-layer formation, followed by cooling to room temperature for solidification of the polyester. The layer of the polyester on the mild steel plate had a uniform thickness of 0.3 mm.

As a result of a cross cut test (according to the test method regulated by Nihon Toryo Kensa Kyokai Shikenhoho Kenkyukai, Japan), it was found that the peeling of the polyester layer was not caused with respect to all the hot-melt polyesters, thus substantiating that the hot-melt polyesters of the present invention have excellent adhesive performances and can be advantageously employed as a hot-melt coating material.

EXAMPLE 5

With respect to the hot-melt polyesters Nos. 6, 7, 11, 12, 25, 30 and 31 obtained in Examples 1 to 3, suitability as a sealing material and a filling material was examined as follows. A glass test tube having an internal diameter of 12 mm and an external diameter of 14 mm was preheated in a dryer thermostatically controlled at 120° C. Using a hand gun AD-25 (trade name of an applicator for pellets, manufactured and sold by Nordson Corp. U.S.A.), a polyester was poured in the molten state at 190° C. into the preheated glass test tube. The polyester completely filled the bottom portion of the test tube to a height of 30 mm within about 10 seconds after pouring. The test tube containing the polyester was gradually cooled to room temperature and the polyester was solidified.

Upon the solidification, there was observed formation of a recess in each of the polyesters on its surface at the central portion thereof. However, the polyesters did not suffer from crazing and almost completely adhered to the walls of the respective test tubes without forming spacings at the interfaces between the polyesters and the walls of the test tubes. Further, the test tubes were each turned upside down and allowed to stand in a dryer thermostatically controlled at 80° C. for 24 hours. However, no changes were observed in any of the hot-melt polyesters filled in the test tubes, thus substantiating that the hot-melt polyesters of the present invention can be advantageously employed as both a hot-melt sealing material and a hot-melt filling material.

What is claimed is:

1. A hot-melt polyester having: (a) acid components consisting essentially of: (I) terephthalic acid monomer units, (II) succinic acid monomer units, (III) glutaric acid monomer units and (IV) a member selected from the group consisting of isophthalic acid monomer units, monomer units of an unsubstituted straight chain aliphatic dicarboxylic acid having 6 to 20 carbon atoms and a combination thereof, the proportions of the components (I), (II), (III) and (IV) satisfying the relationships as represented by the following formulae:

the component (I)=40 to 80 mole % based on the total amount of the components (I), (II), (III) and (IV); the components (II)+(III)=2 to 50 mole % based on the total amounts of the components (I), (II), (III) and (IV); the components (IV)=5 to 50 mole % based on the total amount of the components (I), (II), (III) and (IV); and the molar ratio of the component (II) to the component (III)=1/9 to 9/1, and (b)
a glycol component comprising monomer units of at least one straight chain or branched alkylene glycol having 2 to 10 carbon atoms.

2. A hot-melt polyester according to claim 1, wherein said polyester has a melt viscosity, as measured at a temperature 40° C. higher than the softening point thereof, of 100 to 500,000 centipoises.

3. A hot-melt polyester according to claim 1, wherein said component (IV) comprises isophthalic acid monomer units and monomer units of at least one straight chain aliphatic dicarboxylic acid having 6 to 20 carbon atoms, the molar ratio of the former monomer units to the latter monomer units being 100/0 to 10/90.

4. A hot-melt polyester according to any one of claims 1, 2 or 3 wherein said straight chain aliphatic dicarboxylic acid having 6 to 20 carbon atoms is adipic acid, azelaic acid, sebacic acid or 1,10-decanedicarboxylic acid.

5. A hot-melt polyester according to claim 1 or 2, wherein said component (IV) comprises isophthalic acid monomer units and adipic acid monomer units, the molar ratio of the former monomer units to the latter monomer units being 2/8 to 8/2.

6. An article comprising two adherends bound together with the hot-melt polyester of any one of claims 1, 2 or 3.

7. An article comprising a substrate coated with the hot-melt polyester of any one of claims 1, 2 or 3.

8. An article comprising a substrate with a void therein, the void being filled with the hot-melt polyester of any one of claims 1, 2 or 3.

9. An article comprising two adherends bound together with the hot-melt polyester of claim 4.

10. An article comprising a substrate coated with the hot-melt polyester of claim 4.

11. An article comprising a substrate with a void therein, the void being filled with the hot-melt polyester of claim 4.

12. An article comprising two adherends bound together with the hot-melt polyester of claim 5.

13. An article comprising a substrate coated with the hot-melt polyester of claim 5.

14. An article comprising a substrate with a void therein, the void being filled with the hot-melt polyester of claim 5.

* * * * *

UNITED STATES PATENT AND TRADEMARK OFFICE
CERTIFICATE OF CORRECTION

PATENT NO. : 4,363,853
DATED : December 14, 1982
INVENTOR(S) : IMAMURA ET AL

It is certified that error appears in the above-identified patent and that said Letters Patent are hereby corrected as shown below:

On the first page of the patent, under the heading "Inventors", the name --Hideo Sato-- should be inserted after the name "Kazuyoshi Imamura".

Signed and Sealed this

Thirty-first Day of May 1983

[SEAL]

Attest:

DONALD J. QUIGG

Attesting Officer

Acting Commissioner of Patents and Trademarks